Figure 1:
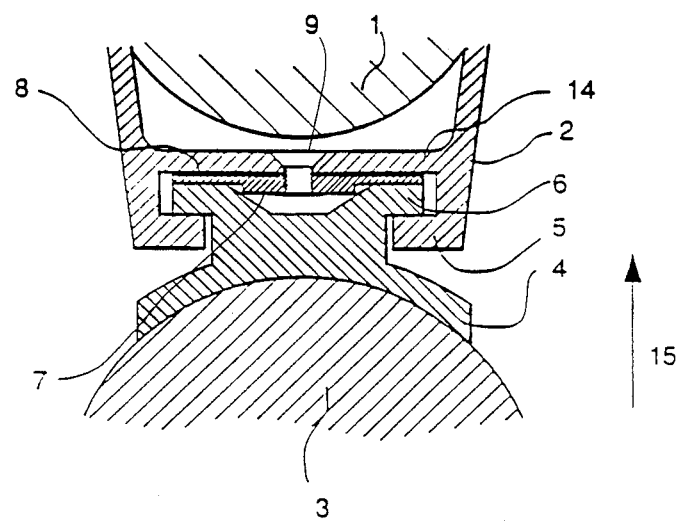

United States Patent [19]

Norrvi et al.

[11] Patent Number: 4,976,183
[45] Date of Patent: Dec. 11, 1990

[54] DEVICE FOR A LAUNCHER ON AIR VEHICLE

[76] Inventors: Hans Norrvi, Solvik, Maspelösa, S-590 61 Vreta Kloster; Arne Wärnström, Lundbygatan 4A, S-595 00 Mjölby; Jan-Erik Wuopio, Söderleden 1, S-582 57 Linköping, all of Sweden

[21] Appl. No.: 460,180
[22] PCT Filed: May 16, 1989
[86] PCT No.: PCT/SE89/00265
  § 371 Date: Feb. 1, 1990
  § 102(e) Date: Feb. 1, 1990
[87] PCT Pub. No.: WO89/12210
  PCT Pub. Date: Dec. 14, 1989

[30] Foreign Application Priority Data
  Jun. 10, 1988 [SE] Sweden ................. 8802168

[51] Int. Cl.⁵ .............. F41F 3/06; F41F 7/00
[52] U.S. Cl. ............................. 89/1.819; 89/1.8
[58] Field of Search ................. 89/1.819, 1.8

[56] References Cited

U.S. PATENT DOCUMENTS

| | | | |
|---|---|---|---|
| 2,940,362 | 6/1960 | Paxton | 89/1.819 |
| 2,981,150 | 4/1961 | Miller | 89/1.819 |
| 3,040,629 | 6/1962 | Duncan et al. | 89/1.819 |
| 3,668,970 | 6/1972 | Walters | 89/1.819 |
| 4,155,286 | 5/1979 | Mihm | 89/1.819 |
| 4,392,411 | 7/1983 | Minkler | 89/1.819 |
| 4,711,151 | 12/1987 | Griffin et al. | 89/1.819 |
| 4,750,404 | 6/1988 | Dale | 89/1.819 |

*Primary Examiner*—David H. Brown
*Attorney, Agent, or Firm*—Lowe, Price, LeBlanc, Becker & Shur

[57] ABSTRACT

A device at a launcher at an air vehicle for detachably carrying and guiding a missile or the like is shown. The launcher comprises means for detachably carrying the missile and means for guiding the missile in the longitudinal direction of the launcher. The latter comprises a first profile element (2) secured in the launcher and a second profile element (4) secured in the missile, which profile elements are arranged to interact in order to admit a free mutual movement in the longitudinal direction of the launcher, while movement in lateral directions is limited. The device according to the invention is characterized particularly in that it comprises a profile plate (7) and a number of relatively thin shims (8), the profile plate (7) and shims (8) being arranged securable in the first profile element (2) to so limit by means of an appropriate number of shims (8) the mutual movement of the first (2) and the second (4) profile element in the load carrying direction across the longitudinal direction of the launcher that the required allowance between the profile elements (2, 4) for mutual movability of the profile elements in the longitudinal direction of the launcher is maintained.

4 Claims, 1 Drawing Sheet

U.S. Patent

Dec. 11, 1990

4,976,183

DEVICE FOR A LAUNCHER ON AIR VEHICLE

The present invention relates to a device at a launcher at an air vehicle for detachably carrying and guiding a missile or the like, which launcher comprises at least one first means for detachably carrying the missile, further comprises at least one second means for guiding the missile in the longitudinal direction of the launcher, the second means comprising a first profile element attached to the launcher, and a second profile element attached to the missile, which profile elements are arranged to intersect so that a free mutual movement in the longitudinal direction of the launcher is admitted, while movement in lateral directions is limited. Such devices are known. Different constructions of the second means have been tested, e.g. springloaded wedge elements, intended to limit the mutual movement of the profile elements so that the tendency to vibrations is reduced while said free mutual movement is maintained.

Hitherto existing devices have, however, shown a number of disadvantages. They have comprised a number of movable parts, which has made the loading process, i.e. the mounting of the missile in the launcher, difficult. It has not been possible to arrange the engagement between the profile elements with a decidedly predeterminable effect with regard to gap and load capability.

The object of the present invention is to accomplish a device of the kind mentioned in the introduction, which comprehends a simple construction that does not show the aforementioned disadvantages, but gives a decidedly predeterminable mutual movability between the profile elements in the second means.

Such a device is characterized according to the invention primarily in that the device comprises a profile plate and a number of relatively thin shims, the profile plate and shims being arranged securable in the first profile element in order to so limit by means of an appropriate number of shims the mutual movement of the first and second profile elements in the load carrying direction across the longitudinal direction of the launcher that the required allowance between the profile elements for their mutual movability in the longitudinal direction of the launcher is maintained.

In a preferred embodiment the profile plate is provided with at least one threaded hole, preferably positioned in a thickened central portion of the profile plate, while the shims are provided with corresponding passing-through holes for securing by screws the profile plate and a required number of shims in the first profile element. It is suitable to arrange at least two holes for a secure attachment.

The shims suitably show individual thicknesses within the range 0.1 to 0.4 mm. The purpose of the shims is that they shall be capable of being combined in a simple manner in order that they together with the profile plate will fill the gap between said profile elements so as to give a predetermined movability between the profile elements in the load carrying direction. The separate first and second profile elements show in practice somewhat varying dimensions.

In one embodiment, in which the second profile element is arranged to be comprised by the first profile element, the profile plate is suitably dimensioned to so project over the longitudinal direction of the first profile element that a guidance at right angles to the longitudinal direction of the launcher is attained, for guiding the second profile element into and to interact with the first profile element. On loading the launcher with a missile there could otherwise be difficulties in fitting in the vertical position of the profile element so that the profile elements can be mutually displaced in the longitudinal direction of the launcher for interaction.

Figure 2:
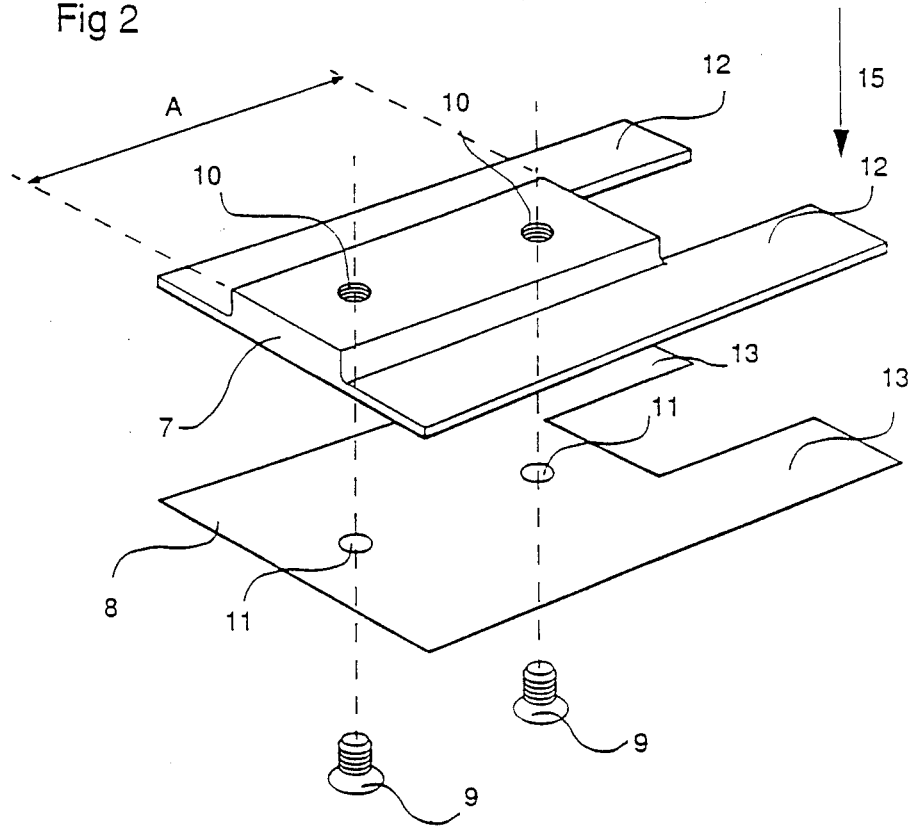

The invention will now be described more particularly with reference to the accompanying figures, of which FIG. 1 shows diagrammatically and in cross section a portion of a first and a second profile element and a device according to the invention, while FIG. 2 shows a perspective on another scale than in FIG. 1 a device according to the invention.

In FIG. 1, 1 designates a portion of a launcher, secured in an air vehicle, e.g. an aircraft, 2 designates a first profile element secured in the air vehicle. A missile 3 is provided with a second profile element 4. The first profile element 2 shows inwardly directed lugs 5, while the second profile element is provided with outwardly directed lugs 6, which are supported against the lugs 5. In the space between the first and the second profile element there is secured a device according to the invention consisting of a profile plate 7 and in this case a shim 8. The device is secured in the first profile element by two screws 9, which engage in threads in two holes 10 in a central, thickened portion of the profile plate 7. The screws 9 are inserted through holes 11 in the shim. The measure A in FIG. 2 depicts the common longitudinal extension of the profile elements when brought together. The profile plate as well as the shim comprises elongation parts or tongues 12 and 13, respectively, which are borne against the bottom plate 14 of the first profile element 2 when they are secured in the bottom plate. These tongues function as guidance for the second profile element 4 at loading the launcher, i.e. at fitting in the second profile element 4, first in the direction of the arrow 15 and then a longitudinal displacement in the longitudinal direction of the launcher. Without these tongues there is the risk that when loading there will be difficulties of finding the right mutual vertical position between the profile elements for bringing them together.

It is understood that the launcher comprises at least one first means for detachably carrying the missile, but this is not shown in the figure.

We claim:

1. A device for a launcher on an air vehicle for detachably carrying and guiding a missile or the like, which launcher comprises at least one means for guiding the missile in the longitudinal direction of the launcher, the guiding means comprising a first profile element (2) attached to the launcher, and a second profile element (4) attached to the missile, which profile elements are arranged to interact so that a free mutual movement in the longitudinal direction of the launcher is admitted, while movement in lateral directions is limited, characterized in that the device comprises a profile plate (7) and a number of relatively thin shims (8), the plate (7) and shims (8) being arranged securably in the first profile element (2) in order to so limit by means of an appropriate number of shims the mutual movement of the first (2) and the second (4) profile elements in the load carrying direction across the longitudinal direction of the launcher, that the required allowance between the profile elements for the mutual movability of the profile elements in the longitudinal direction of the launcher is maintained.

2. A device according to claim 1, characterized in that the profile plate (7) is provided with at least one threaded hole (10), preferably positioned in a thickened central portion of the profile plate (7), while the shims (8) are provided with corresponding passing-through holes (11) for securing by screws the profile plate (7) and a required number of shims (8) in the first profile element (2).

3. A device according to claim 1, characterized in that the individual thickness of the shims (8) is within the range 0.1 to 0.4 mm.

4. A device according to any one of claim 1, wherein the second profile element (4) is arranged to be comprised by the first profile element (2), characterized in that the profile plate (7) is dimensioned to so project over the longitudinal direction of the first profile element (2) a distance greater than the common longitudinal extent of the profile elements when brought together such that a guidance at right angles to the longitudinal direction of the launcher is attained, for guiding the second profile element (4) into and to interact with the first profile element (2).

* * * * *